Jan. 1, 1946.  W. E. FLEMING  2,392,036
TENDERIZING IMPLEMENT
Filed Dec. 27, 1943
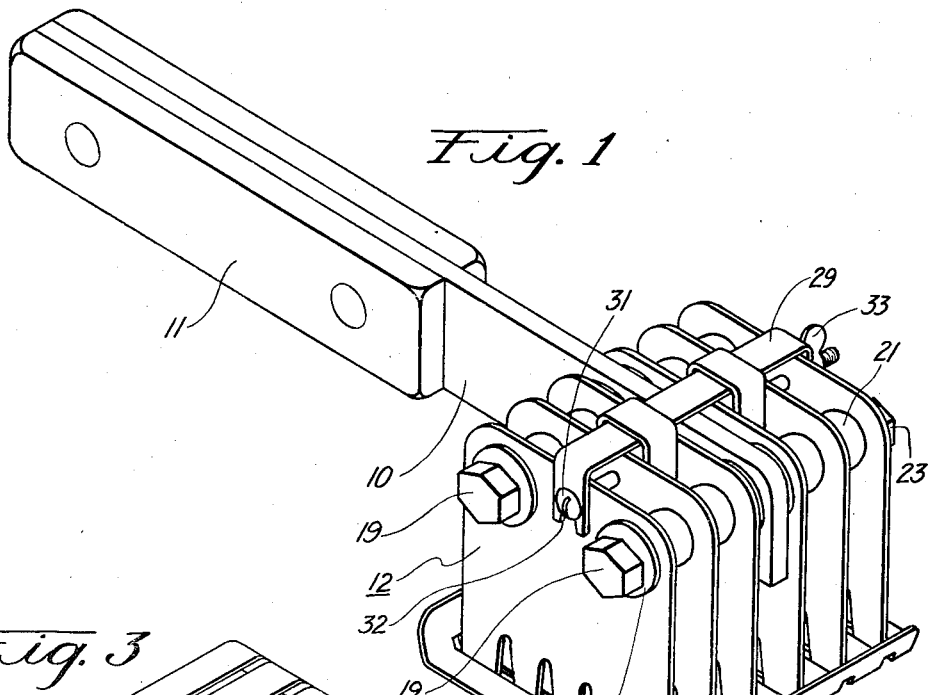
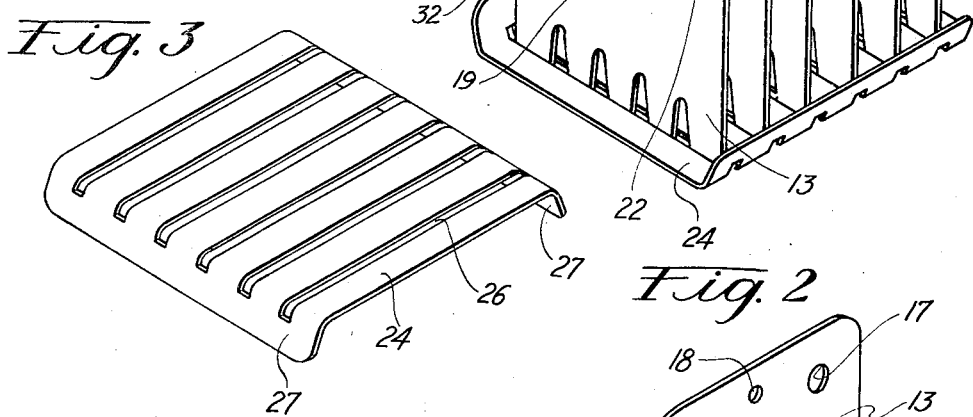
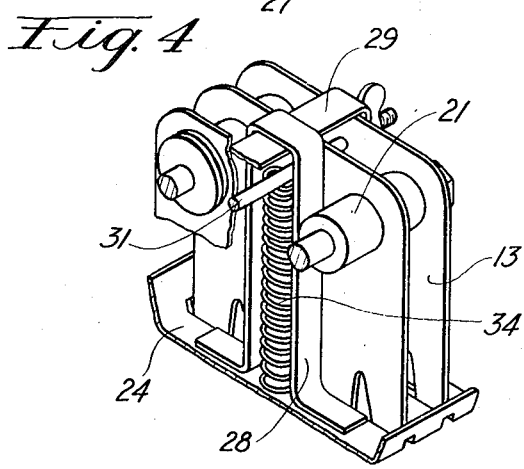
INVENTOR.
WILLIAM EARL FLEMING
BY
Flournoy Corey
ATTORNEY Patented Jan. 1, 1946

2,392,036

UNITED STATES PATENT OFFICE 2,392,036

TENDERIZING IMPLEMENT

William Earl Fleming, Cedar Rapids, Iowa

Application December 27, 1943, Serial No. 515,666

5 Claims. (Cl. 17—30)

This invention relates to means for preparing and processing meats and the like and has particular relation to a means for cutting or tenderizing meat.

It is well known that poor cuts of beef and other meats are rendered much more palatable and easily masticated when the fibres or tissue are chopped or cut so that the fibers are relatively short rather than long and stringy. This process has been known as the process of tenderizing of meat. It may be accomplished by means of a knife or cleaver, but considerable labor is involved in preparing meat with these tools.

Various tenderizing devices have been proposed which employ one or more knives attached to a handle so that the tissue may be cut by a pounding rather than a cutting motion. These devices, however, have the disadvantages in that the pieces of meat or cuttings stick to the blades and the device requires frequent cleaning.

It is among the objects of my invention to overcome these difficulties in the devices of the prior art, and it is one of the main objects of my invention to provide means for removing particles of meat from the blades of the tenderizing implement.

Still another object of my invention is to provide a new and improved stripping means of the above character which will not bind or clog and in which the stripping means is caused to shroud the teeth of the device and move only in such manner that the plane of the stripper is parallel to the plane of the edges of the teeth at all times.

Another object of my invention is to provide a tenderizer structure which may be readily disassembled for cleaning.

Other and further features and objects of the invention will be more apparent to those skilled in the art upon a consideration of the accompanying drawing and following specifications, wherein is disclosed a single embodiment of the invention, with the understanding, however, that such changes may be made therein as fall within the scope of the appended claims, without departing from the spirit of the invention.

In said drawing:

Figure 1 is a view in perspective of a tenderizer constructed according to one embodiment of my invention as it appears while assembled and ready for use.

Figure 2 is a view in perspective showing one of the blades for the device shown in Figure 1.

Figure 3 is a view in perspective of the plate which is employed for removing particles of meat from the blades, and Figure 4 is a fragmentary view in perspective illustrating means for fastening the parts of the structure together so that they may be readily removed for cleaning.

Referring now to the drawing:

A device constructed according to a preferred embodiment of my invention employs a strap handle 10 having grips 11 secured thereto. The cutter portion of the tenderizer, illustrated generally at 12, is comprised of a plurality of approximately rectangular blades 13 with the lower end of the blades sharpened, as illustrated at 14, and having notched indentations 16 in this cutting edge.

The blade is provided with relatively large openings 17 at the upper opposite corners thereof, and another smaller opening at 18 near the center of the upper edge.

In the embodiment of the invention here shown there are six of these blades, although a greater or lesser number may be employed as desired. By notching the lower edges of the blades, each blade makes a series of short cuts or incisions in the slices of meat or other material being prepared, and thus the meat when properly prepared is still in one mass but has been perforated and cut so that the tissue is in relatively short shreds.

In joining these blades, I preferably utilize a pair of bolts as indicated at 19 which are threaded through the openings 17. The blades are separated by cylindrical washers or spacers, such as illustrated at 21 in Figures 1 and 4, and it is quite apparent that any desired separation of blades may be secured in this manner. Of course I utilize flat washers, such as illustrated at 22 beneath the outer ends of the bolts and under the nuts 23. There are holes through the end of the handle 10 to receive the bolts 19 so that the handle and the blades are all secured together by means of the two bolts 19.

This structure just described would be sufficient to cut or tenderize meat, but it is quite apparent that the particles of meat or steak or the like would stick to the blades and make it difficult to continuously use the device as a pounding tool. I therefore utilize a plate, such as shown at 24, and this plate is slotted, as illustrated at 26, so that it may be received on the blades 13. The front and rear edges of the plate 24 are preferably turned up, as illustrated at 27, so that the blade will not stick to the steak or other material being prepared. This stripper plate is held in place by means of a pair of U straps illustrated at 28 and these straps are secured by welding or riveting to the inner face of the stripper plate 24 and the width of the straps 28 are such that they pass between the adjacent blades 13. The strap 28 projects above the upper edges of the blades and in assembling the stripper plate in place, a U-shaped locking bar 29 is inserted beneath the stripper straps 28 and over the opposite faces of the outermost blades 13. A stationary member in the form of a bolt 31 passes through the openings 18 in the blades 13 and the locking bar 29 is secured on the outer end of the bolt 31 by means of the notched portion illustrated at 32. A wing nut 33 is employed on the threaded end of the bolt 31 for securing the locking bar in place beneath the straps 28. Springs 34 are employed between the inner face of the stripper plate 24 and the bolt 31, against which the springs 34 bear, for biasing the stripper plate downwardly to disengage meat or the like from the blades of the tenderizer.

In use and when the device is brought down with a pounding blow on a piece of meat the stripper is driven upward on the blades by the meat. When the tenderizer is lifted the stripper is driven downward by the springs 34 to remove the meat from the blades. The members 28 and the slots on the stripper prevent cocking or binding of the stripper in its up and down movement.

The form of the stripper plate and its slotted association with the blades, the springs and straps cause the stripper to shroud the teeth and move only in such manner that cocking or binding of the stripper plate on the blades is prevented. The plane of the stripper on the blades is always parallel to the face of the teeth regardless of its position on the blades.

A device constructed according to my invention may be employed for tenderizing meat and the device may even be employed for "knitting" together several small pieces into one piece of steak. Meat tenderized by my device is made more palatable and better eating because the tissues are cut and not crushed. The meat so treated does not shrivel in cooking. Poor cuts of meat are materially improved by use of my device. Scraps of meat may be integrated together to form steaks thus eliminating waste. Flavor is preserved. The device is readily cleaned and disassembled. Other foods and meats such as vegetables, liver, veal, pork and the like may be treated by use of my device to be rendered more palatable.

Although I have shown and described a specific embodiment of my invention, it is apparent that modifications thereof may be made by those skilled in the art. Such modifications may be made without departing from the spirit and scope of my invention as set forth in the appended claims.

I claim as my invention:

1. In a device of the character described, a plurality of blades, a plurality of bolts, means associated with the latter for separating and holding the blades in position, a stripper plate having slots therein to be received over the blades, a pair of stripper plate retaining members secured to the stripper and extending upwardly between adjacent blades, spring-receiving means disposed transversely of said blades, one or more springs bearing at one end against said spring-receiving means and bearing at the other end against said stripper plate for moving the latter downwardly relative to said blades, and a locking bar at the upper ends of the blades cooperating with said stripper plate retaining members for holding the stripper blade in place and limiting its downward movement.

2. In a device of the character described, a plurality of blades, a stationary part associated therewith, a plurality of bolts, means associated with the latter for separating and holding the blades in position, a stripper plate having slots therein to be received over the blades, a pair of stripper plate retaining members secured to the stripper and extending upwardly between adjacent blades, a locking bar at the upper ends of the blades cooperating with said stripper plate retaining members for holding the stripper blade in place and limiting its downward movement, and springs disposed within the stripper retaining members and bearing against the stripper plate and against said stationary part for biasing the stripper plate downwardly.

3. In a device of the character described, a plurality of parallel extending blades, means for maintaining said blades in parallel and operative positions, a stripper plate having slots therein to be received on the blades, retaining members between adjacent blades to secure the stripper in place for vertical movement, a bolt passing through the blades, spring means acting between said bolt and said stripper plate to move the latter outwardly relative to said blades, and a locking bar secured on the bolt and extending over the top of the blades and beneath said retaining members to lock the latter in place.

4. A device of the character described, comprising a plurality of spaced apart blades, means for holding said blades in spaced apart relation, each blade having a tenderizing cutting edge, a bar extending across the blades at the side thereof opposite said edges, a stripper plate having slots therein to be received over the cutting edges of said blades, means for fastening said bar in position comprising a member extending through said blades, a pair of stripper plate retaining members secured to said stripper plate and normally engaging said bar to limit the outward movement of said stripper plate, and spring means acting between said stripper plate and said member for moving said stripper plate outwardly as far as permitted by said retaining members coming into engagement with said bar.

5. A device of the character described, comprising a plurality of spaced apart blades, means for holding said blades in said spaced apart relation, each blade having a cutting edge, a stripper plate having slots therein to be received over said cutting edges of the blades, a pair of stripper plate retaining members secured to said stripper plate and extending upwardly between adjacent blades, means carried adjacent the upper edges of said blades opposite said cutting edges and cooperating with said retaining members for limiting the outward movement of said stripper plate and including a bolt, and spring means acting between said bolt and said plate for moving the latter outwardly as far as permitted by said retaining members and said limiting means.

WILLIAM EARL FLEMING.